Figure 1B:
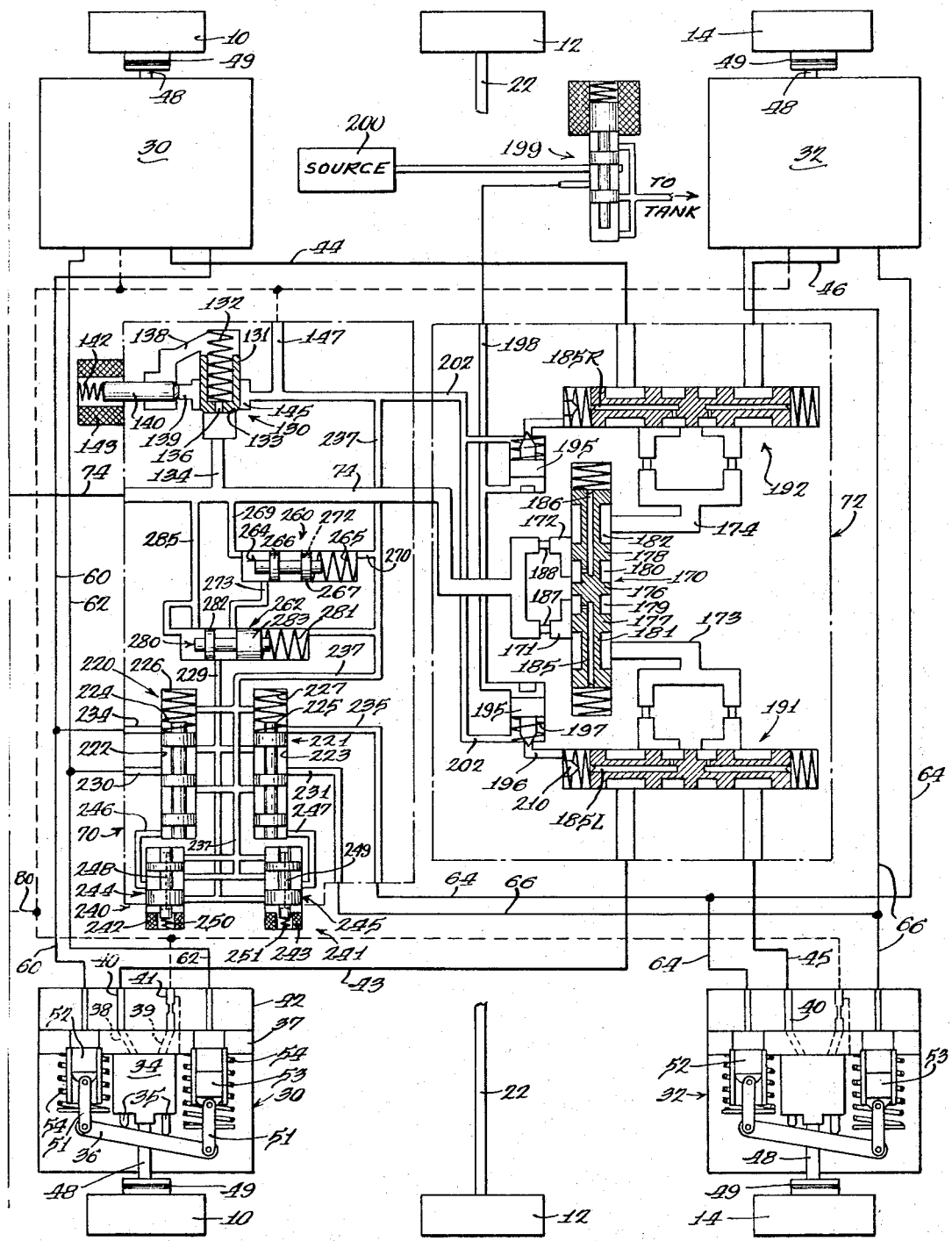

Dec. 20, 1966  J. W. PINKERTON ET AL  3,292,723

HYDROSTATIC TRANSMISSION

Filed March 4, 1965  2 Sheets-Sheet 2

Inventors:
John W. Pinkerton
Edward L. Stout
By Hofgren, Wegner,
Allen, Stellman & McCord Attys

United States Patent Office 3,292,723
Patented Dec. 20, 1966

3,292,723
HYDROSTATIC TRANSMISSION
John W. Pinkerton and Edward L. Stout, Rockford, Ill., assignors to Sundstrand Corporation, a corporation of Illinois
Filed Mar. 4, 1965, Ser. No. 437,149
34 Claims. (Cl. 180—44)

This invention relates to hydrostatic transmissions, particularly hydrostatic transmissions for propulsion of vehicles, and specifically a hydrostatic transmission for power assist drive of vehicle propelling wheels in addition to the normal gear driven vehicle propelling wheels. While a specific use of the transmission is illustrated herein, it should be understood that the utility is not confined to that shown.

It is a general object of the invention to provide a new and improved hydrostatic transmission of the type described.

A more specific object is to provide a new and improved transmission of the character mentioned for power assist in a gear driven vehicle, including a plurality of hydraulic motors, means providing a source of working fluid under pressure to drive the motors, and means for selectively rendering the motors operative or inoperative for power assist drive in different combinations each providing a different speed and torque range.

Another object is to provide a transmission of the type described including at least four hydraulic motors associated in pairs respectively with two axes, together with means for selectively controlling the motors to render all of them inoperative or all of them operative in a forward direction, or two of them operative in a forward direction, or all of them operative in a reverse direction.

A further object is to provide a new and improved transmission of the type referred to, wherein all of the power assist motors are supplied by a single constant pressure pump, with the motors being constant pressure also so as to provide a constant horsepower output.

An additional object is to provide a new and improved hydrostatic transmission as described wherein the pump is driven continuously when the vehicle engine is in operation, while the power assist transmission may be selectively operative or nonoperative, and during nonassist the pump delivery is cut back to a limited flow and pressure sufficient to put the power assist transmission in operation when desired.

Another object is to provide a new and improved transmission of the type described wherein the pump is unidirectionally driven and reversal of the transmission is obtained by reversal of the motor swashplates, so that only one side of the system is subjected to high working pressures.

It is also an object of the invention to provide a new and improved transmission of the character mentioned including a novel flow divider valve means for assuring appropriate division of flow to opposite sides of the vehicle transmission, and for assuring appropriate division of flow between the motors at each side of the transmission.

A further object is to provide a new and improved transmission of the type described including means for retarding rotation of the motors during nonassist.

Figure 1A:
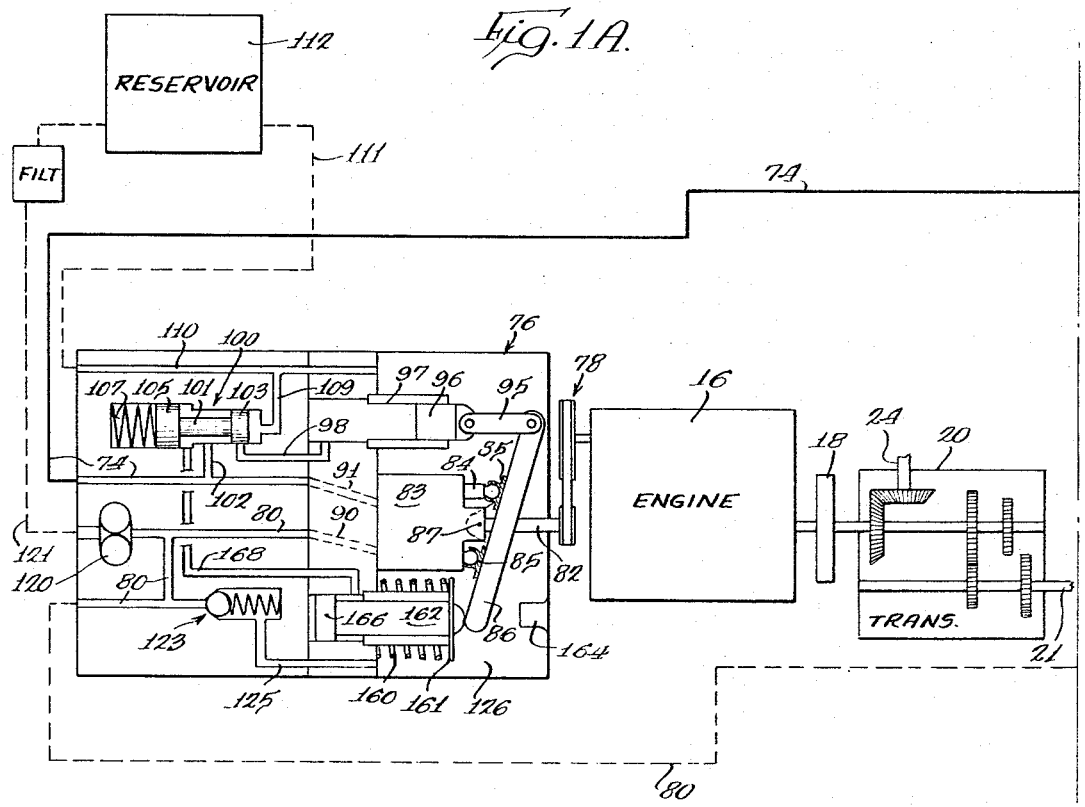

Other objects and advantages will become readily apparent from the following detailed description taken in connection with the accompanying drawings, in which:

FIGS. 1A and 1B together, side by side, with FIG. 1A on the left, illustrate diagrammatically a hydrostatic power assist transmission embodying the principles of the present invention.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings in more detail, the transmission of this invention is illustrated in connection with a vehicle which may be provided with drive wheels in pairs as illustrated at 10, 12 and 14. The vehicle includes a suitable prime mover such as internal combustion engine 16 which drives a torque converter 18 in turn driving a gear box 20 having an output shaft 21 adapted for suitable connection with shafts 22 respectively connected to drive the intermediate wheels 12. The driving connection between shaft 21 and shafts 22 may be conventional and need not be illustrated herein. Additionally, the gear box 20 may be provided with a power take-off shaft 24, frequently referred to as a PTO shaft, for driving auxiliary equipment on the vehicle.

In a vehicle of the type referred to herein, the propelling wheels 12 frequently are relied upon as the sole power for propelling the vehicle, but there may be times when such wheels alone are unable to handle the load on the vehicle. For example, the vehicle might conceivably be a relatively large dump truck in which extremely heavy loads are carried in rough or soft terrain. Accordingly, the wheels 10 and 14 may be driven as herein described for purposes of power assist. That is, the wheels 10 and 14 may be optionally connected or disconnected relative to a hydrostatic drive transmission in order to selectively assist or not assist the gear driven wheels 12.

In the preferred embodiment illustrated, provision is made to use selectively (1) all four wheels 10 and 14 in a forward assist direction, (2) all four wheels in a reverse assist direction, or (3) only the wheels 14 in a forward assist direction. In the forward direction, when all four wheels are assisting, the torque added is relatively great and the speed is relatively low. This may be referred to as the first or low, low gear. When only the wheels 14 are assisting, the speed may be somewhat greater, with somewhat less torque, and this may be referred to as second or low gear.

Toward the ends mentioned, the wheels 10 are adapted to be driven respectively by hydraulic motors 30, and the wheels 14 are adapted to be driven respectively by hydraulic motors 32. The motors 30 and 32 may all be similar in construction, and the construction may largely involve features which may now be considered substantially conventional. As illustrated in the lower portion of FIG. 1B, each motor is an axial piston, rotary cylinder block type including a rotatable cylinder block 34 suitably provided with an annular array of axially disposed cylinders concentric about the axis of the cylinder block and each carrying a reciprocable piston 35 having an outer end adapted to engage an inclinable swashplate 36. The end of the cylinder block remote from the swashplate 36 rotates in engagement with a valve plate as at 37 having appropriately formed, arcuately shaped inlet and outlet ports of well known configuration, illustrated diagrammatically at 38 and 39. The cylinders in the block 34 successively communicate with the inlet and outlet ports on rotation of the cylinder block 34. Ports 38 and 39 respectively communicate with inlet and outlet passages 40 and 41 in a cover plate 42. The inlet ports 40 in motors 30 communicate respectively with pressure passages 43 and 44, while the inlet passages 40 in motors 32 communicate respectively with pressure passages 45 and 46. As will appear, the passages 43, 44, 45 and 46 may be supplied with working fluid under pressure to drive the motors 30 and 32.

In each of the motors 30 and 32, the cylinder block 34 is mounted to rotate with an output shaft 48 adapted to be selectively connected to the respective associated propelling wheel as by means of a fluid pressure operable clutch 49. Control of the flow of pressure fluid relative to the clutches 49 may be had by means forming no part of the present invention and therefore not illustrated herein. It will be sufficient to understood that when pressure fluid is supplied to the clutches, the motor drive shaft 48 is connected to drive its associated power assist wheel, and when pressure fluid is not supplied to the clutches, or when it is drawn from the clutches, the motor shaft 48 is not connected to drive its associated power assist wheel, though there may be frictional engagement between the clutch elements sufficient to transmit from the propelling wheel to the motor shaft sufficient power to rotate the motor cylinder block as a pump unless provision is made to prevent such operation, as explained hereinafter.

In each of the power assist motors 30 and 32, the inclination of the swashplate 36 is variable in opposite directions from a neutral position normal to the motor shaft to provide variable displacement and therefore variable torque and speed at the motor shaft in opposite directions from neutral, while the flow of pressure fluid relative to inlet and outlet ports 40 and 41 is unidirectional. That is, the port 40 is always utilized as the pressure port through which inlet fluid is supplied and the port 41 always acts as the return port through which low pressure fluid discharges from the motor. In order to vary the swashplate angle, each swashplate 36 is pivotally mounted for movement about an axis at least approximately transverse to the axis of the shaft 48 and normal to the plane of the paper, and opposite ends of the swashplate, remote from the pivot are connected as by links 51 to opposite control pistons 52 and 53 working in appropriate cylinders. Preferably, the swashplate is biased toward a neutral center position as by springs 54. Pistons 52 in both of the motors 30 communicate with a control passage 60, while pistons 53 in the motors 30 communicate with a control passage 62. Pistons 52 in the motors 32 communicate with a control passage 64, while pistons 53 in motors 32 communicate with a control passage 66. As will appear presently, the control passages 60, 62, 64 and 66 are appropriately pressurized or drained at suitable times to obtain the desired output from the motors 30 and 32.

Flow of control fluid relative to the passages 60, 62, 64 and 66 is controlled by a valve system in a block illustrated diagrammatically at 70. Flow of working fluid relative to the motor inlets 43, 44, 45 and 46 is controlled by a valve system in a block illustrated diagrammatically at 72. Control fluid to the block 70 and working fluid to the block 72 is supplied from a common source illustrated herein in the form of a pressure conduit 74 which communicates with the outlet from a pump 76 connected as at 78 to be driven by the engine 16 and adapted during the power assist operation to function as a constant pressure source. Return fluid from the motors 30 and 32 and return fluid from the valve block 70 is collected in a common return line 80 leading to the inlet to pump 76.

Pump 76, as illustrated diagrammatically in FIG. 1A, includes a drive shaft 82 driven by gearing 78 and a cylinder block 83 rotatable with the drive shaft and having an annular array of axially disposed cylinders concentric about the drive shaft and carrying reciprocable pistons respectively as at 84. Outer ends of the pistons 84 are spherically shaped and each carries a universally mounted bearing slipper 85 slidably engageable with a swashplate 86 pivotally mounted for adjustment about an axis 87 substantially normal to the plane of the paper, transverse to and intersecting the axis of the shaft 82 at the place where the shaft axis intersects the plane containing the spherical ends of the pistons 84. As described in Hann et al. Serial No. 113,697, filed May 31, 1961, and assigned to the assignee of this application, in a construction of the type described, the fluid pressure moment acting on the swashplate through the pistons tends to move the swashplate toward a minimum displacement position transverse to the shaft axis.

On rotation of the cylinder block 83, the cylinders housing pistons 84 communicate successively with arcuate inlet and outlet ports as illustrated diagrammatically at 90 and 91 which communicate respectively with the return line 80 and the pressure line 74. If desired, in order to accentuate the tendency of the swashplate 86 to return to neutral, the inlet and outlet ports 90 and 91 may be angularly indexed in the direction of cylinder block rotation from a piston dead center plane passing through the axis of the shaft 82 and through the dead center positions the pistons 84 take at opposite extremes of reciprocation, such piston dead center plane lying in the plane of the paper, for example.

During power assist operation of the transmission, the angle of the swashplate 86 is controlled so that the pump 76 delivers fluid to the line 74 at substantially constant pressure. In order to control the angle of the swashplate for such purposes, it is connected by means of a link 95 to a control piston 96 reciprocable in a cylinder 97 to which control fluid is supplied through a control passage 98 under control of a pressure control valve 100.

Valve 100 includes a reciprocable valve member having a reduced central stem portion 101 communicating through a passage 102 with the pressure line 74. At the right end of the stem 101, as illustrated in FIG. 1A, there is a land 103 controlling passage 98, and at the left end of stem portion 101 there is an enlarged land or piston 105, the right side of which is subjected to pressure admitted through passage 102.

In operation, as the pressure in line 74 rises to a value in the vicinity of that desired, such as on the order of 3850 p.s.i., the force of such pressure acting on the right side of piston 105 forces the valve member to the left against the bias of a spring 107. Such motion of the valve member causes movement of the land 103 to a position such as that shown where the flow of pressure fluid to the passage 98 is blocked. This terminates the flow of control fluid to the cylinder 97 to terminate increase in the angle of swashplate 86. If necessary, continued movement of the valve member to the left places the passage 98 in communication with a drain passage 109 to exhaust fluid from the cylinder 97 to a return passage 111 leading to a reservoir 112.

On the other hand, if the pressure in the passage 74 falls below the desired value, the spring 107 causes movement of the valve member toward the right, admitting fluid from the passage 102 to the passage 98 to increase the swashplate angle.

In order to replace leakage fluid from the system, a charge pump 120 has an inlet communicating through a passage 121 with the reservoir 112 and an outlet communicating with the return line 80. The charge pump may be suitably driven by engine 16 and replaces fluid which leaks from the system and maintains a predetermined charge pressure on the return line 80 leading to the inlet port 90 for pump 76. Such charge pressure is controlled by a relief valve 123 communicating with return line 80. Fluid relieved over the valve 123 is discharged through a passage 125 to an interior chamber 126 in the housing for pump 76, which chamber in turn communicates with the return passage 110 leading to reservoir 112.

When the vehicle engine 16 is operating and the power assist transmission is in operation to drive the wheels 10 and 14, or the wheels 14 only, the pump 76 is operated under control of the valve 100 to deliver substantially constant pressure. On the other hand, whether the power assist transmission is in operation or not, the pump 76 is driven by the engine 16 at all times. When the power assist transmission is not in operation, the swashplate 86 in the pump 76 is moved to a minimum displacement position, not neutral, at an angle on the order of 3 degrees, to deliver fluid at a reduced flow rate and reduced pressure, for purposes that will appear.

In order to selectively place the hydrostatic transmission in operation or out of operation, the system is controlled by a valve means 130 in the nature of a bypass between the pressure line 74 and the return line 80. Valve means 130 includes a hollow valve member 131 biased by spring 132 toward a valve seat 133 communicating with a passage 134 leading from pressure line 74. Valve member 131 has a small orifice 136 therethrough leading from the passage 134 to the chamber in which the spring 132 is housed. The spring chamber communicates through a passage 138 with a port 139 controlled by a valve plunger 140.

Valve plunger 140 is controlled to normally take a valve open position relative to port 139 as by means of a spring 142 which, as illustrated, should be interpreted as a tension spring urging plunger 140 to a valve open position. The plunger 140 is movable to the valve closed position illustrated by means of a solenoid winding 143 which, when energized, has the effect of pushing the plunger toward the right as viewed in FIG. 1B.

Port 139 communicates with an annular groove 145 around valve member 131 which in turn communicates with a return passage 147 leading to return line 80.

In operation, when the winding 143 is energized, valve plunger 140 blocks the port 139, so that fluid passing through orifice 136 is blocked from return passage 147, and pressure builds up behind the valve member 131. The larger area exposed to pressure on the backside of valve 131 together with spring 132, forces valve member 131 to the valve closed position illustrated, relative to port 133, as a result of which pressure begins to build up in the pressure line 74 leading to control of the pump 76 to deliver substantially constant pressure fluid as described above, for power assist operation of the hydrostatic transmission.

When the winding 143 is de-energized, spring 142 causes movement of the plunger 140 to the left, opening the port 139, leading to a drop in pressure behind valve member 131. This enables the pressure ahead of the valve member 131 to open the latter, bypassing fluid to the return line 80. This, as described below, allows the pump 76 to deliver at a reduced rate and pressure when the hydrostatic transmission is not used for power assist. At the same time, the limited flow and pressure which is produced by the pump 76 is available to put the system into operation upon energization of winding 143.

Upon de-energization of winding 143, as described above, pressure in the line 74 drops, and valve member 105 moves toward the right, placing control cylinder 97 in communication with the reduced pressure in line 74. Swashplate 86 returns toward neutral under urge of the fluid pressure moment as described above and under the bias of a spring 160 acting against a snap ring 161 on a plunger 162 engaging swashplate 86. Movement of the swashplate toward neutral is limited by means of a stop 164 which holds the swashplate at the minimum displacement position on the order of an inclination of about 3 degrees from neutral.

During assist operation of the transmission, the plunger 162 is retracted to the position illustrated in FIG. 1A by means of fluid acting against a plunger piston 166 and delivered to the piston chamber through a passage 168 communicating with the chamber in which the valve land 105 works. It will be understood that during assist operation, valve land 105, upon taking a position somewhat as shown, admits fluid under pressure to retract plunger 162. On the other hand, during nonassist, valve land 105 moves toward the right, cutting off the supply of pressure fluid through passage 168, allowing movement of plunger 162 toward the stop 164.

Returning now to the power assist operation, and particularly the valve means in block 72 at the right center of FIG. 1B, a flow divider valve 170 is disposed between the pressure line 174 and the power assist motors 30 and 32. Valve 170 has inlets 171 and 172 communicating with pressure line 74 and outlets 173 and 174 communicating respectively with the left side of the transmission and the right side of the transmission in order to control the flow of fluid to the left side and the right side to normally maintain the two flows approximately equal, but to let some limited differential exist if necessary. More particularly, it will be understood that in turning the vehicle, there may exist a condition in which the wheels at one side of the vehicle travel in a shorter path than those at the opposite side. Valve 170 is intended to allow limited differences in the rate of operation at one side of the vehicle as compared to that at the opposite side. However, it will be understood that if the wheels at one side of the vehicle have no traction, as when on ice, while the wheels at the opposite side do have traction, the entire flow would tend to take the path of least resistance, through the motors associated with the wheels which have no traction. Accordingly, the valve 170 is intended to correct for the last mentioned situation to assure that flow will be delivered to the side of the vehicle where the wheels have traction.

More specifically, the valve 170 includes a normally spring-centered valve member in a valve bore communicating with inlets 171 and 172 and outlets 173 and 174. The valve member includes a central land 176, opposite intermediate lands 177 and 178, isolating reduced portions 179, 180, 181 and 182. Longitudinal passages 185 and 186 lead from opposite ends of the valve members respectively to the reduced portions 179 and 180. Radial ports at the entrance ends of passages 185 and 186 provide restrictions which even out minor pressure fluctuations to dampen movement of the valve member.

In operation, when the resistance to turning of the power assist wheels 10 and 14 is similar at opposite sides of the vehicle, the divider valve member, assisted by centering springs at opposite ends, takes a central position as illustrated wherein the flow to opposite sides of the vehicle is similar. If the flow to one side of the vehicle, the left side for example, tends to increase, the pressure drop across an orifice 187 ahead of inlet 171 becomes greater than the pressure drop across an orifice 188 ahead of inlet 172, as a result of which the pressure acting against the lower end of the valve stem through passage 185 becomes less than that acting against the upper end of the valve member through passage 186, and the valve member is urged downwardly restricting the flow opening from inlet 171 to outlet 173 through reduced stem portion 181, and at the same time increasing the flow opening from inlet 172 to outlet 174 through reduced stem portion 182. Under these circumstances, it is contemplated that the increased flow to the right side of the vehicle, where the wheels have traction, would suffice to move the vehicle to the place where traction may be attained at both sides.

As the wheels of the left side of the vehicle attain traction, the resistance to turning increases, and the pressured downstream from orifice 187 builds up to assist in shifting the valve member back toward the center position.

In a system of the type described, where two wheels may be used for driving at one side of the vehicle, it will be understood that there may be differences in traction at the wheels 10 and 14 at one side of the vehicle. Accordingly, a similar flow divider valve 191 is provided between the outlet 173 and the motors 30 and 32 at the left side of the vehicle, and a similar flow divider valve 192 is provided between the outlet 174 and the motors 30 and 32 at the right side of the vehicle. It will be noted that in most respects, the construction of the valves 191 and 192 is similar to that of the valve 170 so that a detailed description of the valves 191 and 192 will not be included.

When all four of the motors 30 and 32 are used in the power assist operation, the operation of the valves 191 and 192 is similar to the operation described in connection with the valve 170. More specifically, the left end of the spring chamber at the left end of each of the valve members in valves 191 and 192 is adapted to be opened or closed, each under control of piston valve member 195 movable relative to port 196 and normally urged to valve open position relative to port 196 by means of a spring 197. When all four motors 30 and 32 are utilized, pressure is supplied to the end of valve members 195 opposite from the springs 197, moving the valve members to valve closed positions so that opposite ends of the valve chambers in the valves 191 and 192 are closed.

Pressure fluid is supplied to the valve member 195 through a passage 198 through a valve represented diagrammatically at 199, controlling communication between the passage 198 and the source of fluid under pressure represented diagrammatically at 200.

In operation, it is contemplated that the source 200 may be the same source as that provided for purposes of controlling clutches 49, a source under pressure on the order of 2,000 p.s.i.

When a suitable switch is closed to energize solenoid winding 143 for power assist, and the vehicle gear shift lever is moved to first, or low, low gear, a suitable switch (not shown) is actuated to energize all clutches 49 and to open the valve 199 suplying fluid under pressure to close the valves 195, so that flow divider valves 191 and 192 function respectively to appropriately divide the flow to the two motors at each side.

When the gear shift lever for the vehicle is moved to second, or low gear, valve 199 is closed, removing the pressure from behind the valve members 195, allowing both to open under the urge of the associated spring 197. This places the ports 196 in communication with a passage 202 communicating with return passage 147, in turn leading to return line 80. Pressure is thus lost at the left ends of the valve members in flow divider valves 191 and 192, and the pressure acting against the right ends of the valve members forces the valve members to the left cutting off the flow to the forward motors 30 and diverting all flow to the rear motors 32. Movement of the valve members to the left ultimately seats valve passages 185L and 185R on a fixed closure member 210, preventing loss of fluid from the pressure source.

In order to select the direction of motor operation and the speed or torque range during power assist operation, that is, to select the number of motors 30 and 32 to be used, and the direction of their operation, two similar control valves 220 and 221 are provided for controlling the flow of control fluid relative to motor control pistons 52 and 53. The valves include valve bores 222 and 223 in which valve members 224 and 225 are received. The valve members are biased downwardly as illustrated by springs 226 and 227 to the positions shown. In such positions, control fluid under pressure may be delivered through a pressure passage 229 to valve bores 222 and 223 and from there to ports 230 and 231 leading respectively to passages 62 and 66 which, it will be recalled, communicate respectively with control pistons 53 in motors 30 and 32 to urge the motor swashplates 36 toward a full stroke position in a reverse direction as illustrated. At the same time, control pistons 52 are drained through passages 60 and 64 which communicate with ports 234 and 235 leading to the bores 222 and 223. Through the chambers for springs 226 and 227, the ports 234 and 235 comunicate with a return passage 237 in turn communicating with return passage 147 ultimately leading to return line 80.

When the valve members 224 and 225 are positioned in an extreme upward position, it will be understood that all four motors are used in the power assist operation, in a forward direction, providing the first or low, low power assist gear, where maximum torque is delivered to the power assist wheels at low speed.

The positions of valve members 224 and 225 are controlled by solenoid valves 240 and 241. When the vehicle gear shift lever is positioned for first gear, and the power assist system is energized, windings 242 and 243 are energized, moving valve members 244 and 245 to an extreme downward position wherein the lower ends of valve members 224 and 225 communicate with pressure passage 229 through ports 246 and 247 leading respectively from the lower ends of bores 222 and 223 to grooves 248 and 249 of valve members 244 and 245. Pressure acting against the lower ends of the valve members 224 and 225 causes the valve members to move upwardly to positions where the pressure passage 229 communicates with ports 234 and 235 leading to control pistons 52. Pressure against the pistons 52 reverses the angle of the swashplates from that shown to cause motor operation in a forward direction. At the same time, ports 230 and 231 communicating with control pistons 53 are placed in communication with return line 237.

For operation of the power assist transmission in reverse, using all four motors 30 and 32, the windings 242 and 243 are de-energized by switch means (not shown) controlled by the vehicle gear shift lever, for example, so that springs as at 250 and 251 move the valve members 244 and 245 upwardly as shown to positions communicating the ports 246 and 247 with the return passage 237.

In order to obtain operation of the motors 32 in a forward direction while not utilizing the motors 30, in second or low forward gear, winding 243 is energized and winding 242 is de-energized. Energization of winding 243 pressurizes control pistons 52 in motors 32 as described above, while de-energization of winding 242 pressurizes pistons 53 in motors 30, reversing the swashplate angle in motors 30. At the same time, the clutches 49 associated with wheels 10 would be de-energized, and valve 199 is de-energized, relieving pressure behind the valve members 195 which results in blocking lines 43 and 44 between motors 30 and the associated flow divider valve 191 or 192.

It will be recalled that though the clutches 49 associated with the wheels 10 are de-energized, there may be a tendency for the wheels 10 to drive the motors 30 as pumps. The arrangement described above is such that when the motors 30 are not used in the power assist operation, the swashplates 6 therein are reversed (as shown) so that any tendency of the motor to pump causes delivery of fluid to passages 43 and 44 which are effectively blocked, with the result that the motor is effectively locked. The motors thus are not driven by the wheels at speeds in excess of those intended.

Similarly, when the power assist is not utilized, in the situation where the transmission is not used for power assist, both solenoid windings 242 and 243 are de-energized, so that the swashplates in all four motors are as shown. Any tendency of the motors to pump causes delivery of fluid backwardly toward the flow divider valves. If the flow is not blocked at the valves 191 and 192, as the flow from the motors 30 might be, it goes across the flow divider valves and together with the fluid delivered by the pump 76 must find its way across the bypass valve 130. The latter imposes a limit on the flow of fluid which affords a sufficient resistance that the motors are unable to pump or at least are unable to pump at speeds in excess of those intended as safe operation.

In order to control the amount of motor stroke, a torque control valve is provided at 260, and to exercise control at pressures below those at which the torque control valve will operate, a torque control bypass valve is provided at 262.

Torque valve 260 includes a valve member 264 biased toward the left as illustrated by a spring 265 and including spaced lands 266 and 267. Valve member 264 reciprocates in a valve chamber communicating at the left end with pressure conduit 74 through a port 269 and at the right end with return passage 237 through a port 270. Valve land 267 is slotted at 272, so that valve land 266 controls communication of a port 273 with ports 269 and 270.

Valve 262 includes a valve member 280 biased toward the left as illustrated by a spring 281 and having spaced lands 282 and 283. The left end of the bore housing valve member 280 communicates with pressure conduit 74 through passage 285. Valve lands 282 and 283 control communication of pressure passage 229 with passages 273 and 285.

In operation, when the hydrostatic transmission is not used for the power assist operation, valve members 264 and 280 are urged to their leftmost positions by the springs associated therewith so that communication is established between the passage 285 and the pressure passage 229. At the same time, communication between the passages 273 and 229 is blocked by land 283 and communication between the passages 269 and 273 is blocked by land 266.

Thus, when the power assist transmission is put into operation, as pressure builds up in the pressure line 74, it is delivered through passage 285 to the passage 229 to control pistons 52 for purposes of moving the motor swashplates 36 toward inclined positions for forward operation. At about 1,000 p.s.i., the pressure of fluid in line 74, acting against the left end of valve member 280, cases movement of the valve toward the right to the position shown where communication between passages 285 and 229 is blocked. Contorl over the motor control pistons 53 is thereby transferred to the torque valve 260.

The presssure in the line 74 continues to rise rapidly, and upon such increase in pressure, valve member 264 is shifted to the right toward the position illustrated where fluid under pressure is ported to the motor control pistons. Generally, valve member 264 assumes dithering or modulating positions when the pressure in line 74 is between about 3,000 p.s.i and 3,300 p.s.i.. Due to the rapid pressure rise in line 74 the time lapsed between shifting of valve member 280 and shifting of valve member 260 will be on the order of something less than one second. When the pressure in line 74 is in the range of about 3,300 p.s.i. to the maximum pressure on the order of 3,850, p.s.i., valve member 264 will usually assume a fully open position somewhat as shown in the drawing.

Ultimately the motor swashplates attain full stroke delivering maximum torque to the power assist wheels. When the pressure in the line 74 reaches the intended value, it is difficult for the pump 76 to deliver sufficient fluid to maintain such pressure with the motors in full stroke. Accordingly, there may be some pressure drop whereupon valve member 264 may move toward the left significantly to allow some loss of fluid pressure from passage 273 and control pistons 52, through the slot 272 in land 267, allowing a reduction in swashplate angle sufficient to allow the system pressure to remain approximately constant.

It will be appreciated that the system described produces a number of meritorious advantages. For example, it provides constant horsepower to the power assist wheels by virtue of the constant pressure system when the power assist system is put into operation. A relatively small pump is required at 76 by virtue of the variable motors and the torque control valve.

An important aspect lies in the arrangement by which the pump is unidirectional and the motor swashplates are reversible so that only one side of a system is ever pressurized at working pressure on the order of 3,500 to 4,000 p.s.i., while the other side of the system, the low pressure side, or return side, is always such. Thus, only one side of the system need be fitted for high pressure. This reduces costs. It obviates the need for reversible flow divider valves.

The flow divider valves assure appropriate division of flow to opposite sides of the vehicle, and at each side appropriate division of flow to the separate motors thereon.

We claim:

1. In a hydrostatic transmission for use with an engine, in combination, a hydraulic pump adapted to be connected for drive by the engine and having an inlet and an outlet, a hydraulic motor having an output shaft, an inlet and an outlet, first conduit means connecting the pump outlet and the motor inlet, second conduit means connecting the motor outlet and the pump inlet, means for varying the displacement of the pump, means for establishing the pressure in said first conduit means in either an upper range or a lower range, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

2. In a hydrostatic transmission for power assist propulsion of a vehicle having an engine and gearing for mechanically propelling the vehicle, in combination, a hydraulic pump adapted to be connected for drive by the engine and having an inlet and an outlet, a plurality of hydraulic motors each having an output shaft, an inlet and an outlet, first conduit means connecting the pump outlet and the motor inlets, second conduit means connecting the motor outlets and the pump inlet, means for varying the displacement of the pump, means for establishing the pressure in said first conduit means in either an upper range or a lower range, including selectively operable valve means for bypassing fluid from the first conduit means to the second conduit means, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

3. A combination as in claim 2, said pressure establishing valve means comprising a bypass passage connecting the first conduit means and the second conduit means, a pressure relief valve member in the bypass passage movable between open and closed positions, a spring urging the relief valve member toward closed position, a passage communicating a chamber behind the relief valve member with a source of pressure, and a solenoid valve for selectively venting or closing the chamber.

4. In a hydrostatic transmission for driving power assist wheels for propelling a vehicle having an engine and gearing for mechanically driving other propelling wheels, in combination, a hydraulic pump adapted to be connected for drive by the engine and having an inlet and an outlet, a plurality of hydraulic motors each having an output shaft, an inlet and an outlet, conduit means connecting the pump outlet and the motor inlets, means for varying the displacement of the pump, means for establishing pump outlet pressure at either an upper range or a lower range, including selectively operable valve means for bleeding pressure from the pump outlet, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

5. In a pumping system, a pump having an input shaft, an inlet and an outlet, means for varying the displacement of the pump, means for establishing pump outlet pressure at either an upper range or a lower range, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

6. In a pumping system, a pump having an input shaft, an inlet and an outlet, means for varying the displacement of the pump, means for establishing pump outlet pressure at either an upper range or a lower range, including selectively operable valve means for bleeding pressure from the pump outlet, said pressure establishing valve means comprising a bleed passage leading from the pump outlet, a pressure relief valve member in the bleed passage movable between open and closed positions, a spring urging the relief valve member toward closed position, a passage communicating a chamber behind the relief valve member with a source of pressure, and a solenoid valve for selectively venting or closing the chamber, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

7. In a pumping system, a pump having an input shaft, an inlet and an outlet, means for varying the displacement of the pump, means for establishing pump outlet pressure at either an upper range or a lower range, including selectively operable valve means for bleeding pressure from the pump outlet, fluid operable means responsive to pump outlet pressure in said upper range for controlling the displacement varying means for the pump to maintain substantially constant pump outlet pressure, means for holding the displacement varying means for the pump in minimum displacement position, and fluid operable means responsive to pump outlet pressure and operative to incapacitate said holding means when pump outlet pressure is in the upper range and to render operative said holding means when pump outlet pressure is in the lower range.

8. In a pumping system, a pump having an input shaft, an inlet and an outlet, means for varying the displacement of the pump, means biasing the displacement varying means for the pump toward a neutral displacement position, stop means cooperable with the displacement varying means for the pump and opposing said biasing means to define a minimum displacement position for the displacement varying means, means in addition to said biasing means for holding the displacement varying means for the pump in minimum displacement position, means for establishing pump outlet pressure at either an upper range or a lower range, fluid operable means responsive to pump outlet pressure and operative to incapacitate said holding means when pump outlet pressure is in the upper range and to render operative said holding means when pump outlet pressure is in the lower range, and fluid operable means responsive to pump outlet pressure in said upper range for controlling the displacement varying means for the pump to maintain substantially constant pump outlet pressure.

9. A combination as in claim 1, including fluid operable means for varying the displacement of the motor, and means responsive to pressure in the first conduit means and controlling the displacement varying means for the motor to increase displacement as the pressure in the first conduit means increases and reduce displacement as the pressure in the first conduit means decreases.

10. A combination as in claim 2, including fluid operable means for varying the displacement of each motor, and means responsive to pressure in the first conduit means and controlling the displacement varying means for the motors to increase displacement as the pressure in the first conduit means increases and reduce displacement as the pressure in the first conduit means decreases.

11. In a hydrostatic transmission for use with an engine, in combination, a hydraulic pump adapted to be connected for drive by the engine and having an inlet and an outlet, a pair of hydraulic motors respectively for opposite sides of the vehicle each having an output shaft, an inlet and an outlet, first conduit means connecting the pump outlet and the motor inlets, second conduit means connecting the motor outlets and the pump inlet, means for varying the displacement of the pump, means for establishing the pressure in said first conduit means in either an upper range or a lower range, fluid operable means responsive to pump outlet pressure in said upper range for controlling the displacement varying means for the pump to maintain substantially constant pump outlet pressure, means responsive to pump outlet pressure in said lower range for holding the displacement varying means for the pump in a minimum displacement position, and a flow divider valve in said first conduit means, including branch inlets communicating with the pump outlet, branch outlets communicating respectively with the motors at opposite sides of the vehicle and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet.

12. In a hydrostatic transmission for use with an engine, in combination, a hydraulic pump adapted to be connected for drive by the engine and having an inlet and an outlet, a pair of hydraulic motors respectively for opposite sides of the vehicle, each having an output shaft, an inlet and an outlet, conduit means connecting the pump outlet and the motor inlets, means for varying the displacement of the pump, means for varying the displacement of each motor, a flow divider valve in said first conduit means, including branch inlets communicating with the pump outlet, branch outlets communicating respectively with the motors at opposite sides of the vehicle and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet, said flow divider valve including a restriction in each valve inlet and means communicating pressure downstream from each restriction with opposite ends of the flow divider valve member respectively, and spring means normally biasing the flow divider valve member to a position equally dividing the flow to the valve outlets.

13. In a hydrostatic transmission for power assist propulsion of a vehicle having an engine and gearing for mechanically propelling the vehicle, in combination, a hydraulic pump adapted to be connected for drive by the engine and having an inlet and an outlet, two pairs of hydraulic motors each pair including one motor for each side of the vehicle, each motor including an outlet shaft, an inlet and an outlet, first conduit means connecting the pump outlet and the motor inlets, second conduit means connecting the motor outlets and the pump inlet, a flow divider valve in said first conduit means, including branch inlets communicating with the pump outlet, branch outlets communicating respectively with the motors at opposite sides of the vehicle and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet, and a flow divider valve between each of said branch outlets and the motors at one side of the vehicle each including a pair of valve inlets communicating with one of said branch outlets and a pair of valve outlets communicating respectively with the motors at one side of the vehicle and a valve member responsive to flow through one valve inlet to one valve outlet significantly in excess of flow through the other valve inlet to the other valve outlet for restricting communication between said one inlet and said one outlet while enlarging communication between said other inlet and other outlet.

14. A combination as in claim 13, each of said flow divider valves including a restriction in each valve inlet and means communicating pressure downstream from each orifice with opposite ends of the flow divider valve member respectively.

15. A combination as in claim 14, including means for selectively venting a chamber at one end of the valve member in each of said last recited flow divider valves so that the valve members move to positions blocking flow to one motor at each side of the vehicle.

16. In a hydrostatic transmission for driving power assist wheels for propelling a vehicle having an engine and gearing for mechanically driving other propelling wheels, in combination, a hydraulic pump adapted to be connected for drive by the engine and having an inlet and an outlet, two pairs of hydraulic motors each pair including one motor for each side of the vehicle, each motor including an output shaft, an inlet and an outlet, conduit means connecting the pump outlet and the motor inlets, means for varying the displacement of each motor in opposite directions from neutral, selectively operable means controlling the direction of movement of the displacement varying means for one of said pairs of motors from neutral, separate selectively operable means controlling the direction of movement of the displacement varying means for the other pair of motors from neutral, a flow divider valve in said first conduit means, including branch inlets communicating with the pump outlet, branch outlets communicating respectively with the motors at opposite sides of the vehicle and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet, a flow divider valve between each of said branch outlets and the motors at one side of the vehicle each including a pair of valve inlets communicating with one of said branch outlets and a pair of valve outlets communicating respectively with the motors at one side of the vehicle and a valve member responsive to flow through one valve inlet to one valve outlet significantly in excess of flow through the other valve inlet to the other valve outlet for restricting communication between said one inlet and said one outlet while enlarging communication between said other inlet and other outlet, and means for selectively moving the valve members in each of said last recited flow divider valves to positions blocking flow to one motor at each side of the vehicle.

17. In a hydrostatic transmission for power assist propulsion of a vehicle having an engine and gearing for mechanically propelling the vehicle, in combination, a hydraulic pump adapted to be connected for drive unidirectionally by the engine and having an inlet and an outlet, a plurality of hydraulic motors each having an output shaft, an inlet and an outlet, first conduit means connecting the pump outlet and the motor inlets, second conduit means connecting the motor outlets and the pump inlet, fluid operable means for varying the displacement of each motor in opposite directions from neutral, selectively operable means controlling the direction of movement of the displacement varying means for said motors from neutral, and torque valve means responsive to pressure in the first conduit means and controlling the flow of control fluid relative to the displacement varying means for the motors to increase displacement as the pressure in the first conduit means increases and decrease displacement as the pressure in the first conduit means decreases.

18. In a hydrostatic transmission for use with an engine, in combination, a hydraulic pump adapted to be connected for drive by the engine and having an inlet and an outlet, two pairs of hydraulic motors each pair including one motor for each side of the vehicle, each motor including an output shaft, an inlet and an outlet, conduit means connecting the pump outlet and the motor inlets, fluid operable means for varying the displacement of each motor in opposite directions from neutral, selectively operable means controlling the direction of movement of the displacement varying means for one of said pairs of motors from neutral, separate selectively operable means controlling the direction of movement of the displacement varying means for the other pair of motors from neutral, and torque valve means responsive to pressure in the conduit means and controlling the flow of control fluid relative to the displacement varying means for the motors to increase displacement as the pressure in the conduit means increases and decrease displacement as the pressure in the conduit means decreases.

19. In a hydrostatic transmission for driving power assist wheels for propelling a vehicle having an engine and gearing for mechanically driving other propelling wheels, in combination, a hydraulic pump adapted to be connected for drive by the engine and having an inlet and an outlet, two pairs of hydraulic motors each pair including one motor for each side of the vehicle, each motor including an output shaft, an inlet and an outlet, first conduit means connecting the pump outlet and the motor inlets, second conduit means connecting the motor outlets and the pump inlet, means for varying the displacement of the pump, fluid operable means for varying the displacement of each motor in opposite directions from neutral, torque valve means responsive to pressure in the first conduit means and controlling the flow of control fluid relative to the displacement varying means for the motors to increase displacement as the pressure in the first conduit means increases and decrease displacement as the pressure in the first conduit means decreases, selectively operable reversible valve means between the torque valve means and the displacement varying means for one pair of motors for selectively porting control fluid to the displacement varying means to determine the direction of variation of the displacement varying means from neutral, and separate selectively operable reversible valve means between the torque valve means and the displacement varying means for the other pair of motors for selectively porting control fluid to the displacement varying means to determine the direction of variation of the displacement varying means from neutral.

20. In a hydrostatic transmission for use with an engine, in combination, a hydraulic pump adapted to be connected for drive by the engine and having an inlet and an outlet, two pairs of hydraulic motors each pair including one motor for each side of the vehicle, each motor including an output shaft, an inlet and an outlet, first conduit means connecting the pump outlet and the motor inlets, second conduit means connecting the motor outlets and the pump inlet, means for varying the displacement of the pump, means for establishing the pressure in said first conduit means in either an upper range or a lower range, fluid operable means responsive to pump outlet pressure in said upper range for controlling the displacement varying means for the pump to maintain substantially constant pump outlet pressure, means responsive to pump outlet pressure in said lower range for holding the displacement varying means for the pump in a minimum displacement position, a flow divider valve in said first conduit means, including branch inlets communicating with the pump outlet, branch outlets communicating respectively with the motors at opposite sides of the vehicle, and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet, a flow divider valve between each of said branch outlets and the motors at one side of the vehicle each including a pair of valve inlets communicating with one of said branch outlets and a pair of valve outlets communicating respectively with the motors at one side of the vehicle and a valve member responsive to flow through one valve inlet to one valve outlet significantly in excess of flow through the other valve inlet to the other valve outlet for restricting communication between said one inlet and said one outlet while enlarging communication between said other inlet and other outlet, fluid operable means for varying the displacement of each motor in opposite directions from neutral, selectively operable means controlling the direction of movement of the displacement varying means for one of said pairs of motors from neutral, separate selectively operable means controlling the direction of movement of the displacement varying means for the other pair of motors from neutral, and torque valve means responsive to pressure in the first conduit means and controlling the flow of control fluid relative to the displacement varying means for the motors to increase displacement as the pressure in the first conduit means increases and decrease displacement as the pressure in the first conduit means decreases.

21. In a hydrostatic transmission for use with an engine in combination: a hydraulic pump adapted to be connected for drive unidirectionally by the engine and having an inlet and an outlet, means for varying the displacement of the pump on one side of a neutral position, means for preventing a reversal of the displacement varying means to the opposite side of neutral, a hydraulic motor having an output shaft and an inlet and an outlet, first conduit means connecting the pump outlet and the motor inlet, second conduit means connecting the motor outlet and the pump inlet, and means for varying the displacement of said hydraulic motor, said hydraulic motor displacement varying means being movable from a neutral position toward maximum displacement positions on both sides of neutral, whereby the transmission is fully reversible and only the first conduit means carries high pressure fluid.

22. In a hydrostatic transmission as defined in claim 21 wherein the means for preventing a reversal of the displacement varying means includes a positive stop for limiting the minimum displacement position of said pump displacement varying means to a value greater than zero.

23. In a hydrostatic transmission as defined in claim 1, wherein said fluid operable means includes means for biasing the displacement varying means of the pump toward neutral, and positive stop means for limiting the minimum displacement of the pump to a value greater than zero.

24. In a hydrostatic transmission for use with an engine, in combination: a hydraulic pump unit adapted to be connected for drive by the engine and having an inlet and an outlet, a pair of hydraulic motor units respectively for opposite sides of the vehicle, each having an output shaft, an inlet and an outlet, conduit means connecting the pump outlet and the motor inlets, means for varying the displacement of at least one of said units, a flow divider valve in said first conduit means including branch inlets communicating with the pump outlet, branch outlets communicating respectively with the motors at opposite sides of the vehicle, and a valve member responsive to flow through one branch inlet to one branch outlet significantly in excess of flow through the other branch inlet to the other branch outlet for restricting communication between said one branch inlet and said one branch outlet while enlarging communication between said other branch inlet and said other branch outlet, said flow divider valve including a restriction in each valve inlet and means communicating pressure downstream from each restriction with opposite ends of the flow divider valve member respectively separate from said branch outlets, and spring means normally biasing the flow divider valve member to a position equally dividing the flow to the valve outlets.

25. In a hydrostatic transmission for use with an engine, in combination with a drive transmission for transmitting power between the engine of a vehicle and a pair of propelling wheels: a hydrostatic power assist system including a hydraulic transmission separate from the drive transmission for transmitting power from the engine to a second pair of wheels, means for varying the speed ratio of said hydraulic transmission, means for selectively activating said hydraulic transmission when power assist is desired, a second hydraulic transmission for transmitting power from the engine to a third pair of wheels, means for varying the speed ratio of said second hydraulic transmission, and means for selectively activating said second hydraulic transmission when power assist is desired.

26. The combination as defined in claim 1, wherein said means responsive to pressure in said first conduit means includes torque valve means for porting fluid to said motor fluid operable means for maintaining pressure in said first conduit means substantially constant, and bypass valve means responsive to pressure in said first conduit means connected to disable said torque valve means at pressures in said first conduit means below a predetermined value and to control the flow of fluid to said motor fluid operable means.

27. The combination as defined in claim 26 wherein said motor fluid operable means vary the displacement of each motor in opposite directions from neutral, and selectively operable valve means between said bypass valve means and said motor fluid operable means for controlling the direction of movement of the displacement varying means of said motors from neutral.

28. In a hydrostatic transmission for use with an engine, in combination with a drive transmission for transmitting power between the engine of a vehicle and a first pair of propelling wheels respectively at opposite sides of the vehicle: a hydrostatic power assist transmission including pump means adapted to be driven by the engine, a pair of motors, first conduit means connecting the pump means to deliver fluid to the motors, second conduit means connecting the motors to return fluid to the pump means, an output shaft means connected to be driven by said motors for transmitting power to a second pair of wheels, means for abling and disabling said motors including means controlling flow to the motors and selectively operable clutch means in said output shaft means for abling and disabling the drive transmission between said motors and said second pair of wheels, and means operable on disengagement of said clutch means for restricting flow from said motors to prevent the motors from running at excessive speeds when the motors are disabled and tend to be driven by the clutch means.

29. The combination as defined in claim 28 wherein said means for restricting flow from said motors includes valve means in one of said conduit means for positively blocking flow from said motors.

30. The combination as defined in claim 28 wherein said means for restricting flow from said motors includes relief valve means in one of said conduit means for yieldably blocking flow from said motors.

31. The combination as defined in claim 28 and further including fluid operable means for varying the displacement of said motors in opposite directions from neutral, selectively operable valve means for placing said fluid operable displacement varying means on one side of neutral to activate said motors during power assist operation thereof and for reversing said fluid operable displacement varying means to the opposite side of neutral on disabling said motors, said valve means for reversing said fluid operable means being operable on disengagement of said clutch means, said means for restricting flow from said motors including valve means in said first conduit means whereby the motors when reversed will tend to pump fluid in said first conduit means against said restricting valve means thereby to prevent excessive rotation of said motors.

32. The combination as defined in claim 31, including a second pair of motors for transmitting power from the engine to a third pair of wheels respectively at opposite sides of the vehicle, said first conduit means being connected to deliver fluid to said second pair of motors and said second conduit means being connected to deliver fluid from said second pair of motors to said pump means, fluid operable means for varying the displacement of said second pair of motors in opposite directions from neutral, selectively operable valve means for placing said second pair of motors, fluid operable displacement varying means on one side of neutral to activate said second pair of motors during power assist operation thereof and for reversing said fluid operable displacement varying means for the second pair of motors to the opposite side of neutral on disabling said second pair of motors, means for abling and disabling said second pair of motors including selectively operable clutch means for abling and disabling the drive transmission between said second pair of motors and said third pair of wheels, and means operable on disengagement of said clutch means for said second pair of motors for restricting flow from said second pair of motors to prevent said second pair of motors from running at excessive speeds when disabled and tend to be driven by the clutch means for the second pair of motors.

33. The combination as defined in claim 32 including flow divider valves in said first conduit means between the pump outlet and the motors at each side of the vehicle each including a pair of valve inlets communicating with the pump outlet and a pair of valve outlets communicating respectively with the motors at one side of the vehicle and a valve member responsive to flow through the valve to regulate flow to the motors, said means for restricting flow from the first pair of motors including valve means for shifting said movable flow divider valve members to block flow in said valve outlets connected to said first pair of motors, said means for restricting flow from said second pair of motors including pressure relief valve means for restricting flow through said valve outlets connected to said second pair of motors.

34. A combination as defined in claim 28 wherein said pump means includes means for varying the displacement of the pump, means for establishing pressure in said first conduit means in either an upper range or a lower range including selectively operable valve means for bypassing fluid from the first conduit means to said second conduit means, said selectively operable valve means being connected to restrict flow from said motors when the motors are disabled, fluid operable means responsive to pump outlet pressure in said upper range for controlling the displacement varying means for the pump to maintain substantially constant pump outlet pressure, and means responsive to pump outlet pressure in said lower range for holding the displacement varying means for the pump in a minimum displacement position.

References Cited by the Examiner
UNITED STATES PATENTS

| | | | |
|---|---|---|---|
| 1,902,972 | 3/1933 | Rouse | 60—53 |
| 2,210,129 | 8/1940 | Rose | 60—53 |
| 2,267,177 | 12/1941 | Twyman | 60—52 |
| 2,588,866 | 3/1952 | Moon | 60—53 |
| 3,053,043 | 9/1962 | Knowler | 60—6 |
| 3,055,169 | 9/1962 | Seibold et al. | 60—54 |
| 3,114,424 | 12/1963 | Voreaux et al. | 60—53 X |
| 3,175,354 | 3/1965 | Firth et al. | 60—52 X |

EDGAR W. GEOGHEGAN, *Primary Examiner.*